United States Patent [19]

Rizzo

[11] 4,073,569

[45] Feb. 14, 1978

[54] PRISMATIC STEREOSCOPIC VIEWER

[76] Inventor: John Rizzo, 1546 W. 11th St., Brooklyn, N.Y. 11204

[21] Appl. No.: 670,374

[22] Filed: Mar. 25, 1976

[51] Int. Cl.$^2$ ............................................. G02B 27/22
[52] U.S. Cl. .................................... 350/137; 350/141; 350/143
[58] Field of Search ............... 350/133, 134, 135, 137, 350/138, 141, 143, 144

[56] References Cited

U.S. PATENT DOCUMENTS

| | | | |
|---|---|---|---|
| 51,906 | 1/1866 | Swan | 350/138 |
| 2,787,191 | 4/1957 | Horton et al. | 350/141 |

*Primary Examiner*—John K. Corbin
*Assistant Examiner*—Matthew W. Koren

[57] ABSTRACT

A stereoscopic viewer using a prism to separate the two images and capable of producing a stereoscopic effect from one image due to refraction in the prism; in one embodiment a V shaped slide mount containing one transparency normally oriented and a second laterally reversed may be mounted in a housing causing a light switch to close, activating a bulb which illuminates a diffusing glass which lights the transparencies, the light passing through the transparencies to refract through the prism and converge on a front magnifying lens from which a viewer can see the image stereoscopically; a single slide may also be inserted in the viewer and a black flexible slide switch operated to cover one face of the prism and to light the bulb to show the image stereoscopically; movie films may be projected on screens and the images refracted through a prism and magnified through a magnifying lens to permit a viewer to see stereoscopic movies.

1 Claim, 15 Drawing Figures

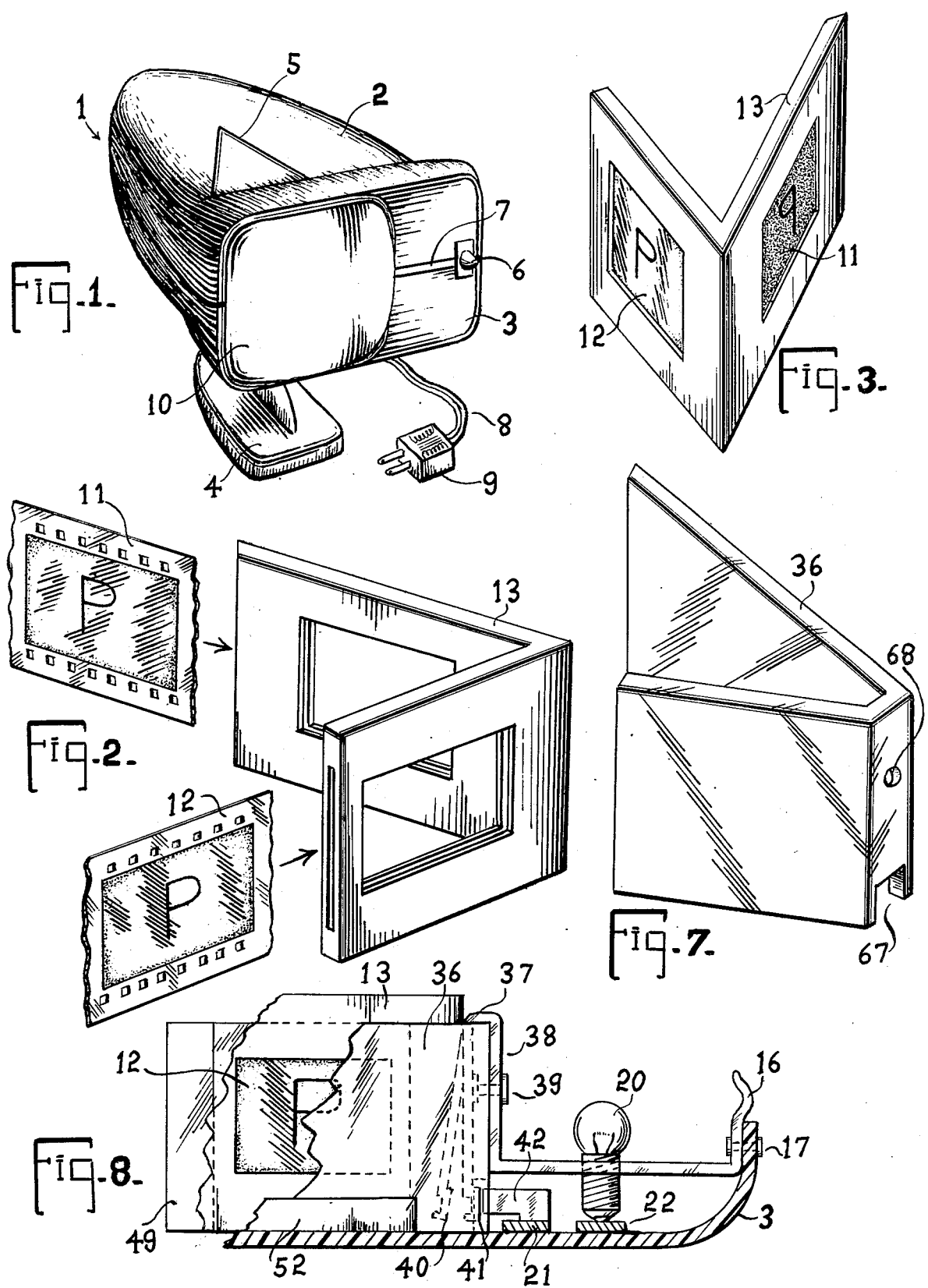

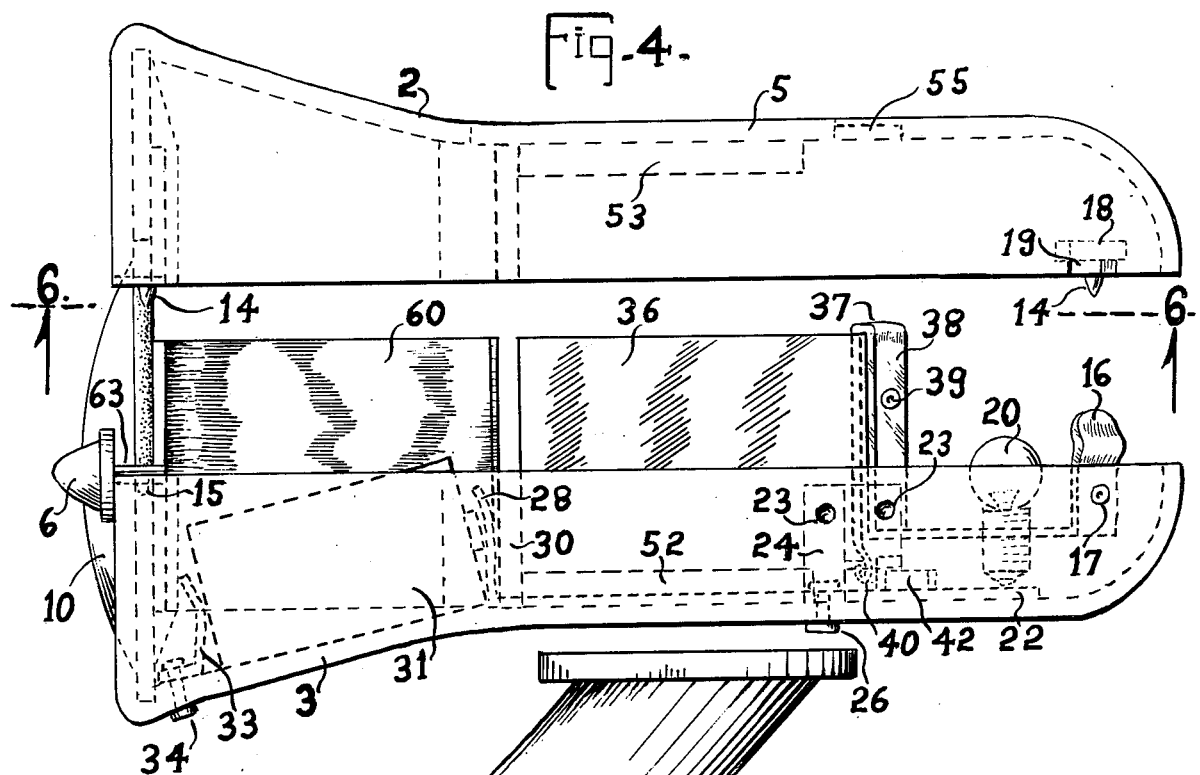
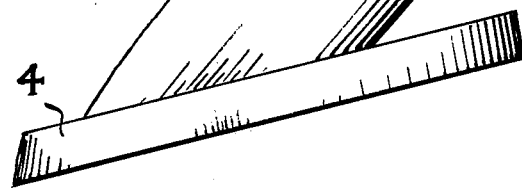
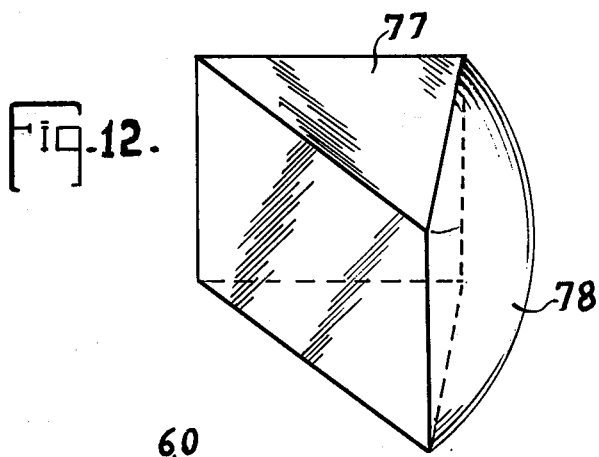

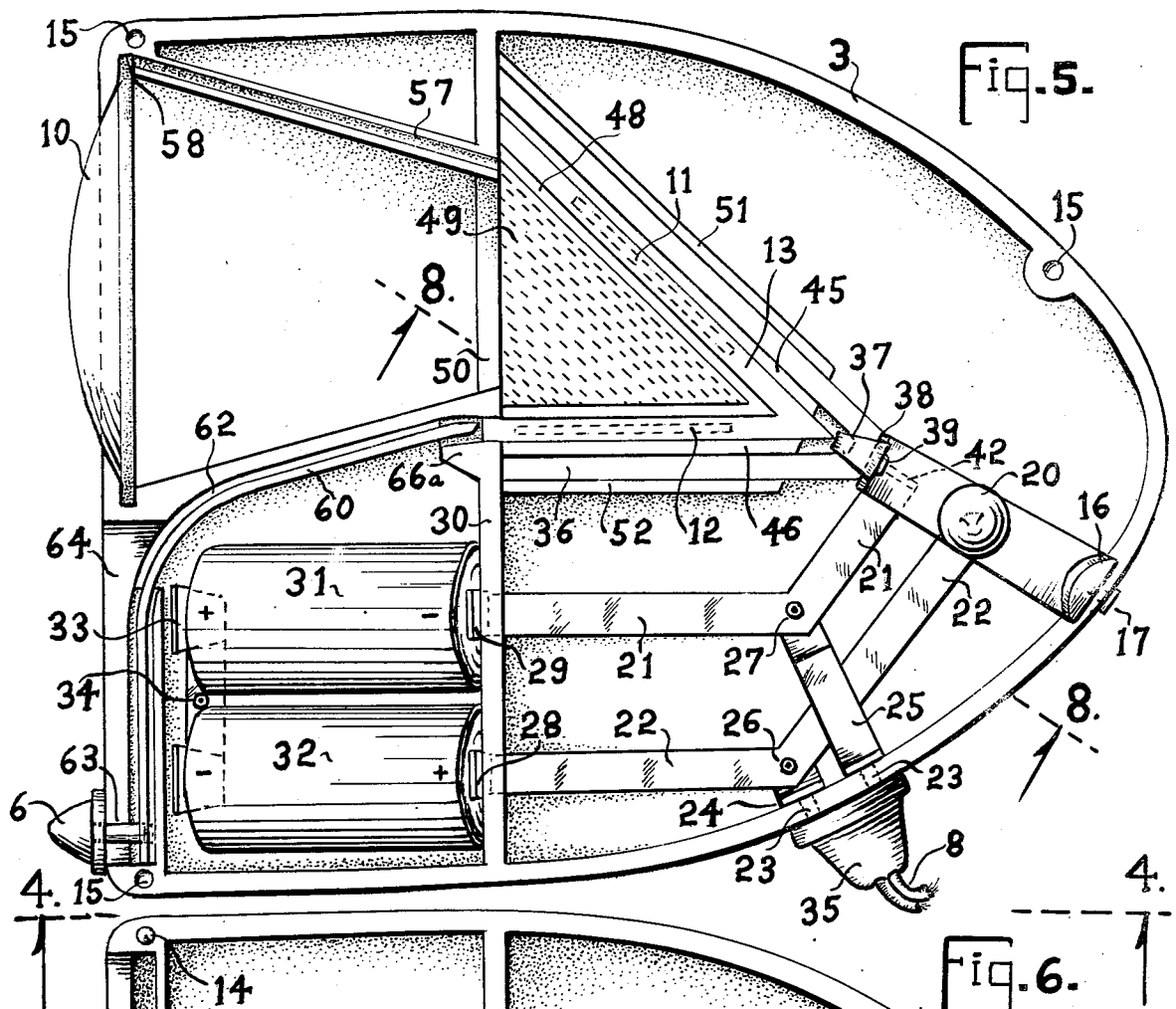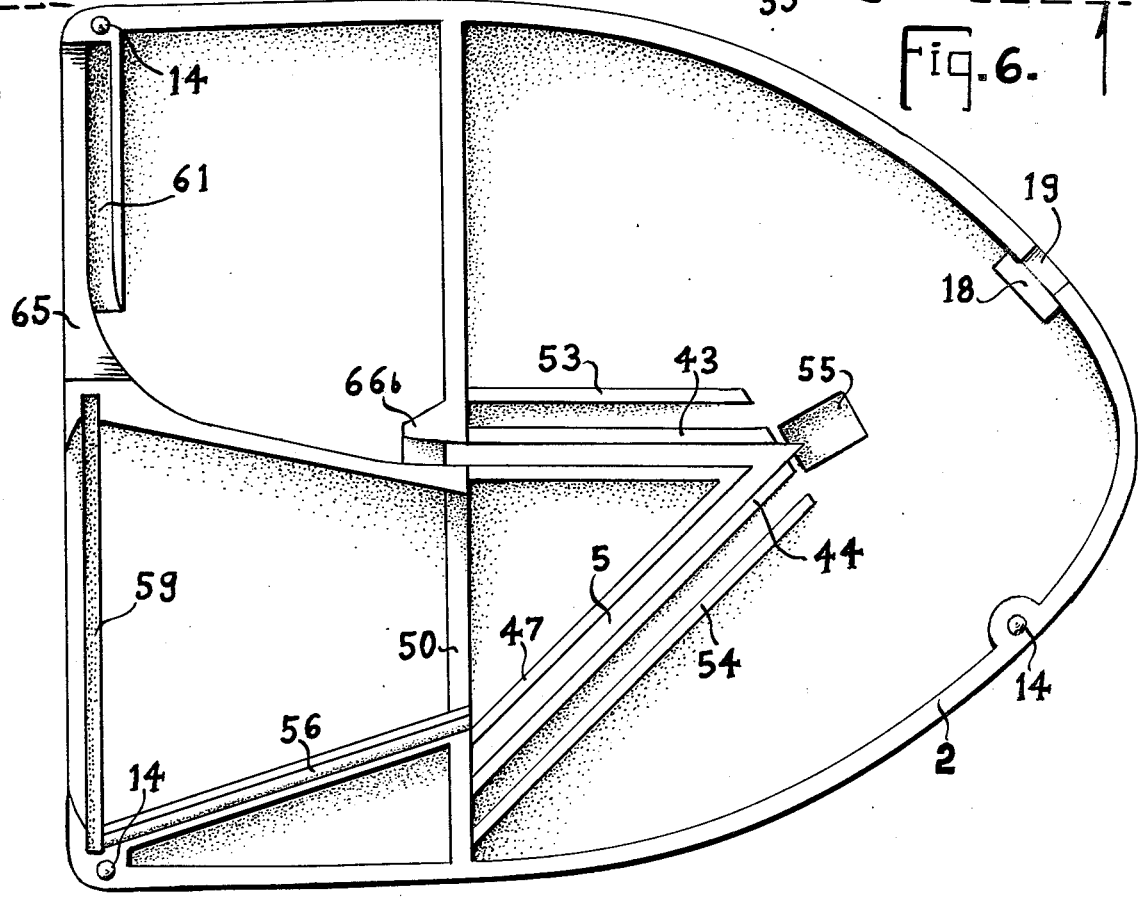

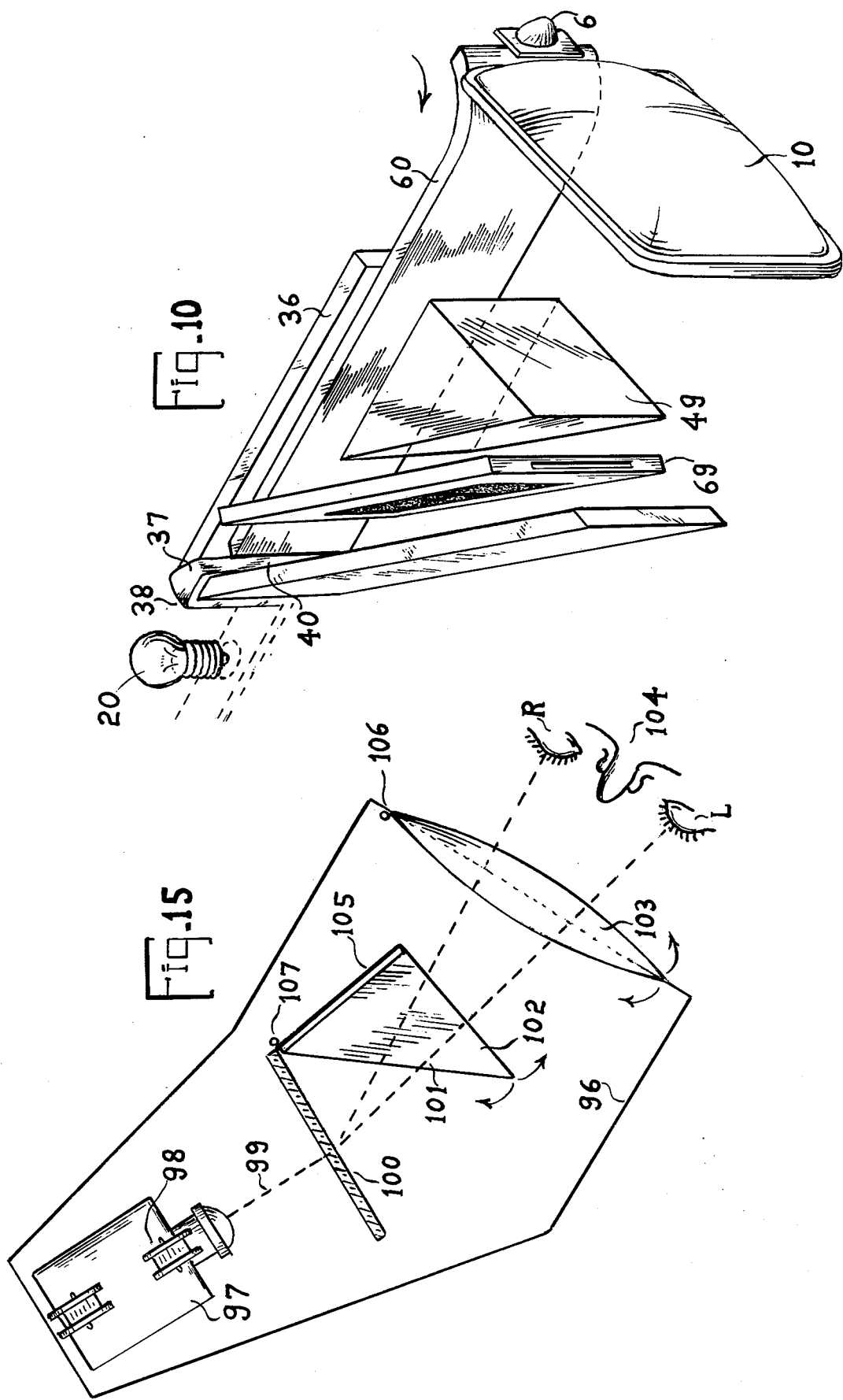

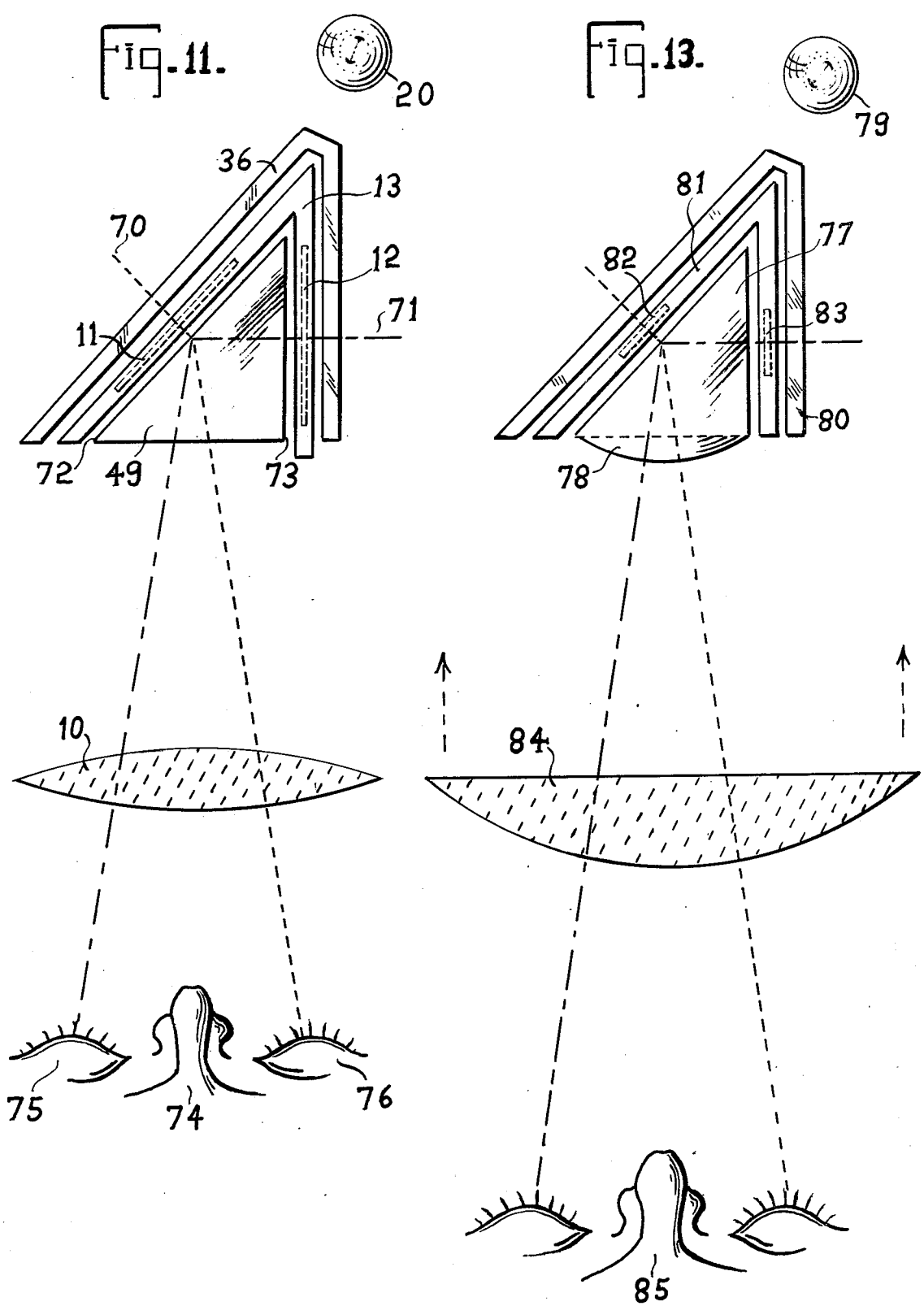

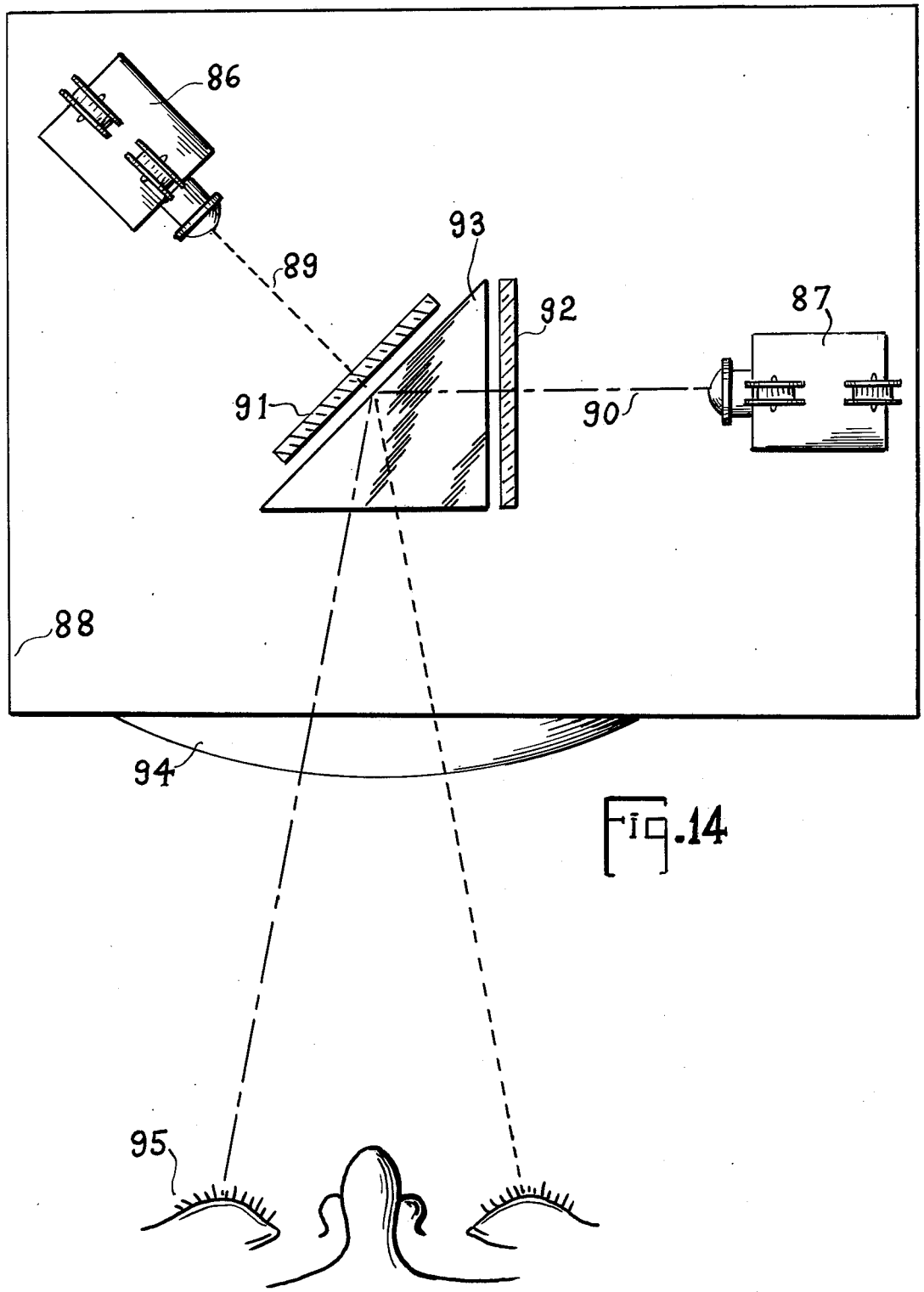

PRISMATIC STEREOSCOPIC VIEWER

BACKGROUND OF THE INVENTION

Various devices are known for the creation of a three dimensional effect for a viewer of an image. Images have been produced in different colors where a viewer would wear glasses having different colors for each eye to separate the different colored images. Special screens have been created for the purpose of rendering separate images to the two eyes or for the purpose of creating a plurality of levels of images within the screen. Devices have been used that use a moving screen and generate a plurality of images causing the viewer to see a three dimensional effect. Also, mirrors have been used to combine stereoscopic images for a viewer.

SUMMARY OF THE INVENTION

My invention uses a prism to combine a pair of stereoscopic images so that a viewer gets a three dimensional effect when viewing the images through my device. In one embodiment of my invention, the viewer can get a three dimensional effect when viewing a single image through my device. My device requires only a single lens rather than a pair of adjacent lenses.

It has been found that the three dimensional quality of the images is enhanced by the use of a large aperture lens. In fact, it is believed that the closer the aperture size of the lens approaches the spacing between human eyes the more closely the image produced by that lens will come to generating a three dimensional effect in and of its self. Accordingly, it is an object of my invention to provide a stereoscopic viewer that uses a prism to separate a pair of images for a viewer. Another object of my invention is to provide a viewer which may create a three dimensional effect for a viewer when viewing a single image. It is still another object of my invention to provide a stereoscopic viewer wherein the light source of the viewer is actuated by the insertion of a slide mount into the viewer. A further object of my invention is to provide a viewer in which a sliding switch may actuate the light source in the viewer where a single slide is being viewed. A still further object of my invention is to provide a stereoscopic viewer for single reels of movie film. Yet another object of my invention is to provide a viewer of stereoscopic movie films.

Additional objects of this invention include the use of an acute angle stereo slide mount and the use of an acute angle diffusion glass in a stereo viewer using a prism to produce the stereo affect, the use of a single bulb to illuminate both transparencies, the disclosure of a stereoscopic viewer that may be held at a comfortable distance from the viewer to avoid eye strain, the elimination of double or ghost images in the stereoscopic image, and the production of a stereoscopic effect from a two dimensional single image of slightly less stereoscopic intensity than two images produce.

My device may be used without the front lens when viewing large transparencies and when using a large prism.

Still other objects and advantages of my invention will be in part obvious and in part apparent from the following description.

BRIEF DESCRIPTION OF THE DRAWINGS

The invention can be more fully understood by reference to the following description in view of the accompanying drawings, in which:

FIG. 1 is a perspective view of the viewer.

FIG. 2 is an exploded view of the assembly of the V shaped slide mount.

FIG. 3 is a perspective view of the assembled slide mount with pictures mounted therein.

FIG. 4 is a partially exploded side view of the viewer. FIG. 4 is also a section of FIG. 5 in the plane 4—4.

FIG. 5 is a top view of the lower section of the viewer.

FIG. 6 is a view of the lower surface of the upper section of the viewer removed from the lower section of the viewer and taken in the plane 6—6 of FIG. 4.

FIG. 7 is a perspective view of the diffusing glass used in the viewer.

FIG. 8 is a view of the slide actuated light switch taken in the plane 8—8 of FIG. 5.

FIG. 9 is a view of the switch actuating flexible black curtain removed from the viewer.

FIG. 10 is a perspective view of the important components of the viewer removed from the housing with a standard slide mount in position to be viewed.

FIG. 11 is a top view of the major components of FIG. 5 in use.

FIG. 12 is a perspective view of an alternative prism lens used for greater magnification.

FIG. 13 is a top view of another set of components for use with the alternative lens to magnify variety of sizes of images.

FIG. 14 shows a device for viewing two sets of movie films.

FIG. 15 shows a device for viewing a single movie film.

DESCRIPTION OF THE PREFERRED EMBODIMENTS

Referring now to FIG. 1, a housing 1 consisting of an upper 2 and lower 3 sections is mounted on the base 4 and the housing section 2 forms a V shaped slot 5 for receiving a slide. A sliding nob 6 traveling in a slot 7 for activating an internal switch can be seen on the face of the housing 1. A line cord 8 is attached to the housing proximally and distally is connected to a transformer 9 for matching 110 volt AC current to the voltage of the batteries mounted in the housing 1. The transformer 9 is encased in a plug for insertion in a wall outlet. The viewing lens 10 is mounted in the front of the housing 1.

Referring to FIGS. 2 and 3 two transparency films 11 and 12 are inserted into a V shaped mount 13. The mount 13 forms a finger grip and is of sufficient height to extend above the slot 5 while inserted therein. The base side of each transparency is seen facing the viewer in FIG. 2, but when the films and the mount are assembled in FIG. 3, the emulsion is seen in transparency 11 while the base is facing out in the transparency 12. This relationship of the right most transparency having its emulsion face outward and the left most transparency having the base face out is maintained in all the embodiments of this invention. It is also to be noted that the left leg of the mount holding transparency 12 is shorter than the right leg of the mount holding transparency 11.

Referring now to FIGS. 4, 5, 6 and 8, we see the lower housing section 3 separated from the housing section 2. A plurality of prongs 14 descending from the upper section 2 engage a plurality of prong recesses 15 in the lower section 3 to hold the two sections together in conjunction with a clip 16 riveted 17 to the lower section 3 and engaging a slip notch 18 in the upper section 2. A fingernail notch 19 permits access to the clip 16 for opening the upper section 2. The lens 10 can be seen extending from the face of the housing. A bulb 20 is seen to be connected to electrical connections 21 and 22. A socket 23 is connected to connecting strips 24 and 25 and are held to connectors 21 and 22 by rivets 26 and 27. Connecting strip 25 is elevated over connector 22 for insulation. Insulation coatings may be applied to the connectors 22 and 25 if necessary. Contacts 28 and 29 are connected through molding 30 from connectors 21 and 22. Batteries 31 and 32 are connected in series to contacts 28 and 29 by battery spring clip 33 which is riveted 34 to the housing section 3. A plug 35 connected to a line cord 8 can connect an external electrical source in parallel with the batteries. The bulb 20 can be lighted using either the batteries or the external current. A diffusion glass 36 is seen mounted in the housing with a slide activated switch 37 mounted over the diffusion glass 36 to engage the slide mount 13 and close the electrical connections activating the bulb 20. The switch 37 forms an inverted U shaped bend and the fixed vertical arm 38 is riveted 39 to the diffusion glass 36. The flexible arm of the switch 37 bears a spring contact 40 which is moved to position 41 when ever the slide mount 13 is inserted into the slot 5. This in turn causes upper projecting electrical contact 42 to close the circuit causing current to flow through connector 21 to connector 22 via the bulb 20. The mount 13 is positioned within the slot 5 by internal ridges 43 and 44 in the upper housing 2 and 45 and 46 in the lower housing 3. Upper ridge 47 in the upper housing section 2 and oblique angle ridge 48 in the lower housing 3 positions the prism 49 against molding 50, and serves to internally position the slide mount 13 with the transparency films 11 and 12 properly positioned relative to the prism 49 and the front lens 10 for proper viewing of the images in the transparencies 11 and 12. The diffusion glass 36 is positioned by ridges 51, 52, 45, and 46 in the lower housing 3 and by ridges 53, 54, 43 and 44 in upper housing 2. Recess 55 in the upper housing 2 supports and positions the switch 37. Raised ridge 56 of the upper housing 2 engages the recess 57 in the lower housing 3 to prevent light from entering the side of the housing between the lens 10 and the prism 49. The front lens 10 is supported in turn, by recesses 58 in housing section 3 and 59 in housing section 2. The sliding nob 6 for activating the internal switch 37 is connected to a flexible curtain 60 which is constrained by a recess slot 61 in the upper housing 2 and a recess 62 in the lower housing 3. A shaft 63 connects the nob 6 to the curtain 60 and the shaft 63 travels in the slot that is formed by the recess 64 of the lower housing 3 and the recess 65 of the upper housing 2 when the housing sections 2 and 3 are connected. If a single mounted transparency is placed in the left most part of the V shaped slot where transparency 11 of mount 13 usually goes, or between ridges 48 and 45, then sliding the nob 6 causes the curtain 60 to slide along the area where the right most transparency 12 would have been between ridges 48 and 46. The guides 66A and 66B in the housing sections 3 and 2 will hold and guide the curtain 60 into engagement with the switch 37. This permits the use of single slides with this viewer to obtain a three dimensional stereoscopic effect when viewing a single slide. The prism 49 is a 90° — 45° — 45° prism with a short side of the prism facing the magnifying lens 10.

With regard to FIG. 7, the diffusion glass 36 may be made of a flexible plastic material and forms a cut out 67 along the bend in the diffusion glass through which the slide activating switch 37 can close, and an aperture 68 for a rivet 39 for securing the switch to the diffusion glass.

In FIG. 9, the nob 6 is seen mounted to the flexible black curtain 60.

In FIG. 10, the nob 6 has been pushed in the direction of the arrow to cause the black curtain 60 to move along the diffusion glass 36 into engagement with the flexible arm contact 40 of the switch 37, and the distal part 38 is seen connected to the bulb 20. Light from the bulb 20 passing through the diffusion glass 36 will illuminate the slide 69 and the light will pass through the prism 49 and out the magnifying lens 10 to a viewer. The curtain 60 blocks light from the other side. The single slide 69 may be viewed from a distance of three to six feet from the viewer, which is a greater distance than used to view double slides such as those in mount 13.

Referring to FIG. 11, the bulb 20 is seen passing light through the diffusion glass 36 through the transparencies 11 and 12, through the prism 49 and through the front lens 10. Beams of light 70 and 71 pass through the approximate centers of the transparencies 11 and 12 in the mount 13 and into the faces 72 and 73 of the prism 49 where they are refracted and then pass on through the front lens 10, at such relative angles that a viewer 74 may view the stereoscopic images with his eyes 75 and 76 comfortably up to two feet from the front of the viewer when his eyes are level with the prism and diffusion glass, and front lens. Beam 70 will reach eye 76 and beam 71 will reach eye 75.

In FIG. 12, a prism 77 and magnifying glass 78 can be seen in perspective combined as a single unit.

In FIG. 13 the bulb 79 produces light to pass through another diffuser 80 to illuminate a slide mount 81 for 16 mm. transparencies 82 and 83 which have smaller image areas than the 35 mm. transparencies commonly used in the slide mount 13. Light leaving the transparencies in the slide mount 81 passes into the prism 77 and magnifying glass 78 unit, which refracts and magnifies the images before the light passes through the viewing lens 84 to the eyes of the viewer 85 where the increased magnification permits convenient enjoyment of these smaller images. The front lens 84 can be moved forward to adjust to the viewing of 35 mm. slides in this mount.

In regard to FIG. 14, a projector 86 is used for one half of a set of stereo images and a projector 87 is used for another half of the set of stereo images. Both projectors are mounted in housing 88. The images are reversed in projector 86 so that the base side of the film is facing the projecting lens in projector 86. This camera must accept the reversed film and must have a reversed foot to engage the sprocket holes of the reversed film. Means is provided to synchronize the two projectors 86 and 87 so that comparable images will be projected 89 and 90 on diffusion screens 91 amd 92. Light from the diffusion screens will be refracted through prism 93 and through magnifying lens 94 to the viewer 95. The projectors can be moved for focusing and alignment, and the screens may be against or slightly away from the prism.

Another embodiment of the invention is employed in FIG. 15. This system relates to moving pictures in 3—dimension from single reel films. FIG. 15 will illustrate the positioning of the projector and the angle of the prism to be used in relation to the lens and screen. Angles that are shown are fixed, and to my knowledge give maximum depth perception. There may be deviations of all elements in angle from this position.

In this system, the projector sits behind the screen, and due to this fact the screen must be partly transparent. Specifically, it may be made of a fine light diffusing plastic, or a fine silk screen. Normally all elements of this system are contained in a housing 96. A conventional projector 97, is provided with any two dimensional film 98. Film 98 must be reversed as in the system of FIG. 14, and must also have a reversed foot for sprocket holes.

When a lighted image 99 is transmitted through a translucent screen 100, the light will enter the hypotenuse 101 of the prism 102. The light will then be refracted through the prism 102 to a lens 103. An observer 104 with his eyes located on the same level, and in parallel with the front lens 103, will see the image 99, and with a 3—dimensional result. The light will be refracted through the prism 102 in such a way that a different view of the same scene will be seen by the right eye than that seen by the left eye. Looking at FIG. 15, one face 105 of prism 102 is painted black. This side is not used for transmitting light in this system. Experiment has shown that the side used gives better results.

An adjustment can be made for the prism 102 and front lens 103 to pivot at points 106 and 107 together. Arrows indicate direction of adjustment to be made towards screen 100, or away from screen 100. If adjustment is made toward observer 104 an increase in stero effect will result. If prism 102 and lens 103 is pivoted towards screen 100, then a reduced stereo effect will result, but with a less strain on the eyes of the observer 104.

I must include at this point that the prism acts as a magnifying lens, and will increase the size of the image slightly without help from the front lens. The front lens is used to help enhance the effect, and to further increase the size of the picture. This is necessary when using a small prism or a small film. It is obvious that there are other ways to achieve the same desired results, for instance moving the projector and screen, and holding the lens and prism. This invention is not limited to the present arrangement. The prism may vary in shape and size.

One object of this invention is that it can be used as a home movie stereo viewer.

The prism is made out of plastic in these embodiments. The angles, shapes, and sizes might change from the 90° — 45° — 45° configuration if different materials are used such as glass.

What is claimed is:

1. A prismatic stereoscopic viewer comprising, in combination,
a housing having separate upper and lower sections and containing a recess in a front portion of said housing,
a magnifying lens mounted in said recess,
a prism mounted in said casing behind said lens, said housing containing a V shaped slot in said upper section adjacent to said prism,
a V shaped slide mount removably inserted into said V shaped slot, said housing forming V shaped pairs of ridges adjacent to said V shaped slot,
an acutely bent V shaped diffusion glass supported by said V shaped pairs of ridges inside the housing adjacent to said V shaped slot,
an electrically conductive clip of spring material fixed to said lower section of said housing and extending upward within said upper section of said housing, said upper section containing a slip notch engaged by said clip holding said sections together, said clip having an inward extending portion terminating in an inverted U shaped bend of said clip, said U shaped bend having a vertical arm fixed to said V shaped difusion glass and a switch extending within said V shaped diffusion glass below said V shaped slot,
a light bulb mounted in said housing beyond said diffusion glass on said inward extension of said clip,
battery means within said housing,
an electrical contact,
electrical connectors connecting said contact and said bulb to said battery means so that insertion of said V shaped slide mount moves said switch against said contact lighting said bulb, said housing containing a lateral slot adjacent to said lens,
a black flexible curtain slidably mounted within said casing, and
a sliding nob attached through said lateral slot to said curtain so that said curtain may be slid by said nob into contact with said switch moving said switch against said contact and lighting said bulb while said curtain underlies one side of said V shaped slot for the viewing of conventional slides inserted in the other side of said V shaped slot.

* * * * *